United States Patent Office 3,217,250
Patented Nov. 9, 1965

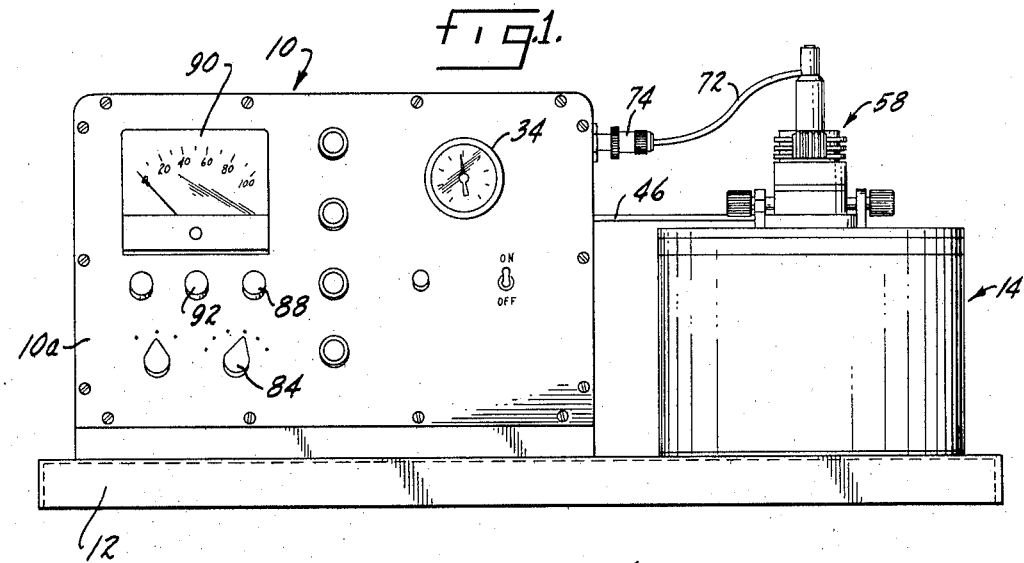
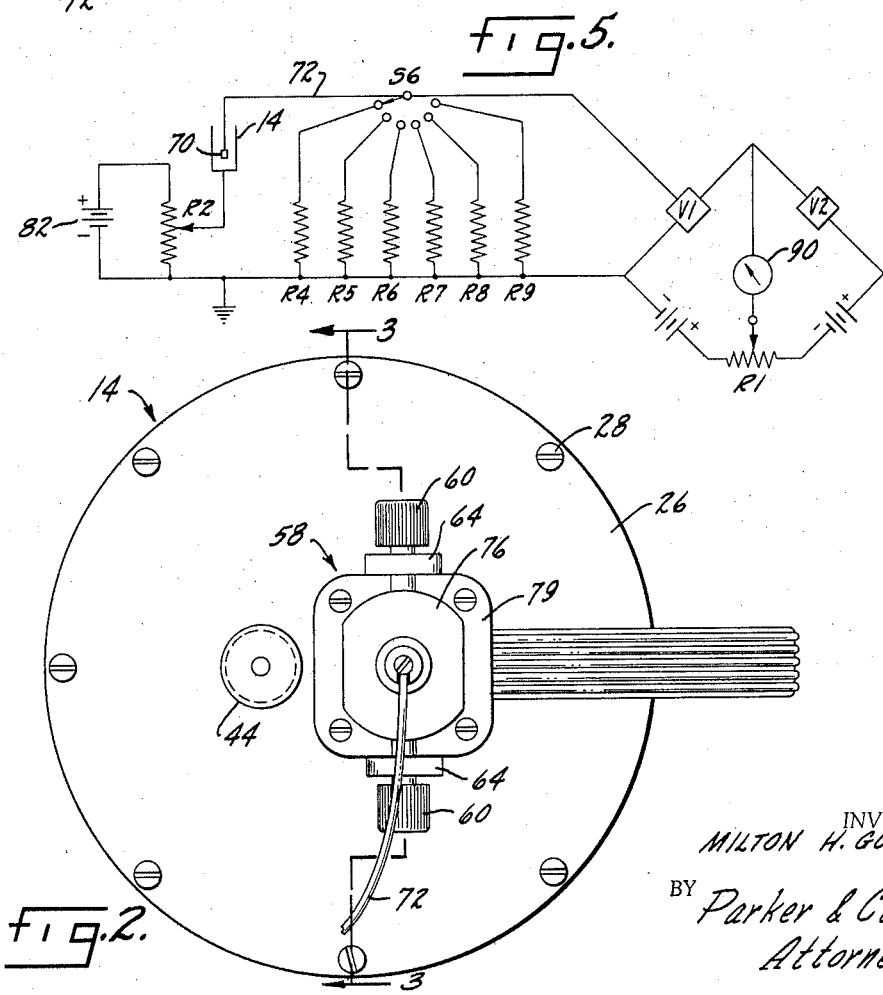

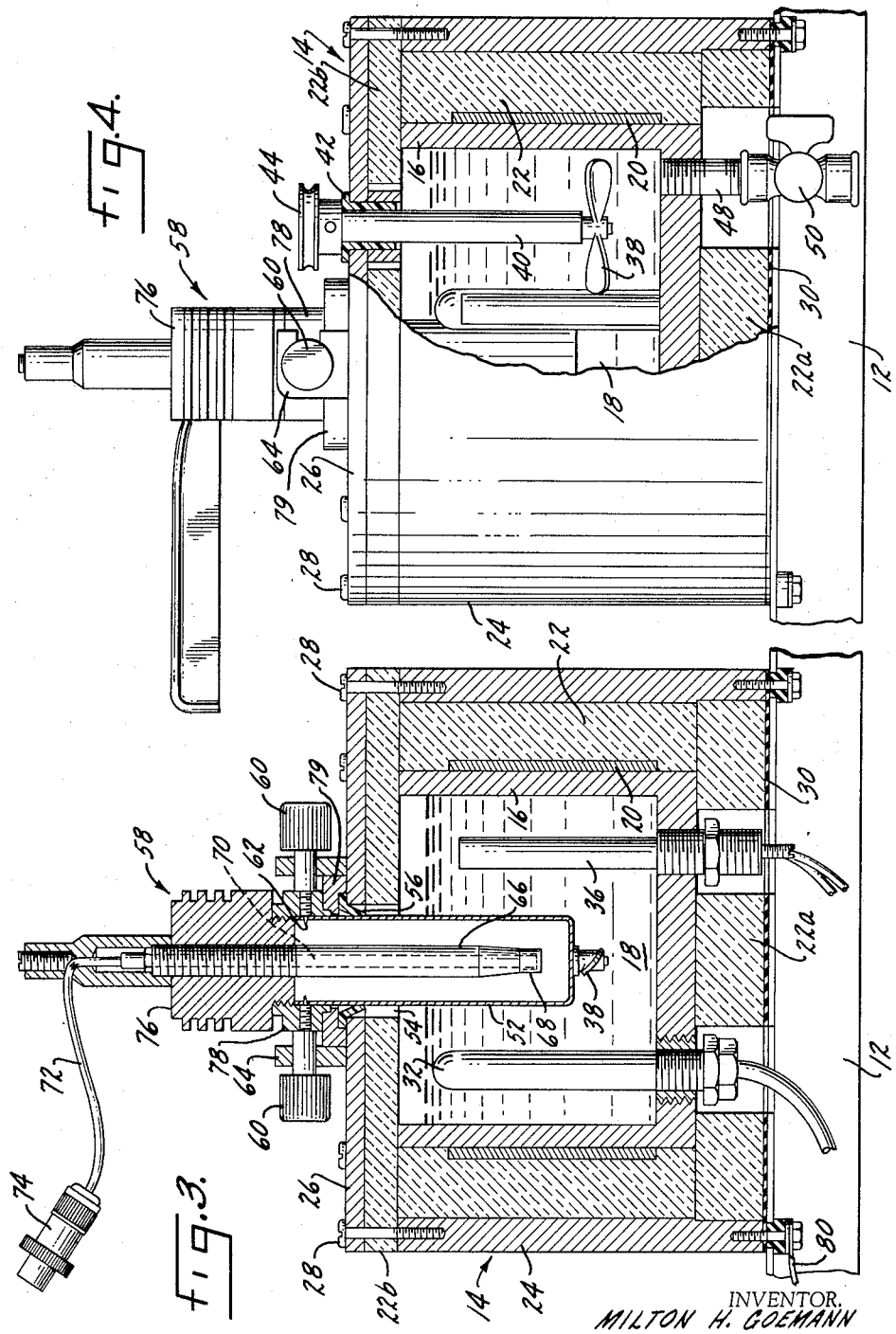

3,217,250
ELECTRICAL CONDUCTIVITY CELL WITH THERMOSTATICALLY CONTROLLED HEATER
Milton H. Goemann, Clarendon Hills, Ill., assignor to Eppi Precision Products, Incorporated, Clarendon Hills, Ill., a corporation of Illinois
Filed Mar. 14, 1962, Ser. No. 179,713
3 Claims. (Cl. 324—65)

This invention relates to a means for measuring degradations of liquids.

A primary purpose is a device suitable for measuring changes in the electrical conductivity of liquids.

Another purpose is a device of the type described in which all variables other than the liquid to be tested are precisely controlled.

Other purposes will appear in the ensuing specification, drawings and claims.

The invention is illustrated diagrammatically in the following drawings wherein:

FIGURE 1 is a side view of the control cabinet and heating unit of the present invention, FIGURE 2 is a top plan view of the heating unit, FIGURE 3 is a vertical section along plane 3—3 of FIGURE 2, FIGURE 4 is a side view of the heating unit, with portions broken away, and FIGURE 5 is a wiring diagram illustrating diagrammatically the electrical circuit used herein.

Considering FIGURE 1, a control cabinet 10 may be positioned on a suitable platform or base 12 adjacent a heating tank 14. The cabinet 10 may have a control panel 10a and may be formed of a suitable sheet steel construction.

FIGURES 2, 3 and 4 illustrate the details of the heating tank and probe. The tank indicated at 14 may be generally cylindrical and it may include an inner generally cylindrical pot 16 which contains a suitable heat transfer agent or the like 18. Surrounding the pot 16 is a band heater 20 which is used to bring the temperature of the heat transfer agent and the material being tested up to a predetermined temperature. As described herein the invention is being used to test the degradation of liquid lubricants. It should be understood however that the invention may be used to test the degradation of any liquid providing that a change in quality of the liquid is reflected in a change in its electrical resistance or conductivity. When lubricants are being tested it is desirable to increase their temperature to increase the sensitivity to changes in their electrical conductivity. With other liquids it may be desirable to maintain the liquid at ambient temperature or to reduce the temperature.

Surrounding the pot 16 and the heater 20 is a circumferential layer of insulation 22. The insulation also extends across the tank bottom, as at 22a, and across the tank top, as at 22b. The tank 14 may have a suitable cylindrical outer shell 24 and a cover plate or the like 26, fastened to the cylinder 24 by screws or the like 28. The bottom of the tank may be mounted on a lower gasket 30 which is used to electrically insulate the tank from the base 12, as the tank is not at the same electrical ground as the base and cabinet.

Mounted within the pot 16 is a thermometer bulb 32 which is used to give a remote indication of the temperature within the tank, this temperature being indicated on dial 34 on the panel 10a. A suitable thermostat 36 is also positioned in the pot 16 and is used to control the heating element 20.

In some applications it is desirable to agitate the heat transfer agent to have a uniform temperature distribution. An agitator blade 38 may be mounted on a shaft 40 which extends upwardly through a bearing 42 mounted in the cover 26 of the tank. At the top of the shaft 40 is a suitable pulley 44 which is driven by a belt or the like 46 and a suitable drive motor, not shown, and positioned within the cabinet 10.

A suitable drainpipe or the like 48 may open into the botom of the pot 16 to drain the heat transfer agent. A valve 50 may be used to control the flow through the drain 48.

The heat transfer agent may vary considerably providing that it is non-toxic, is physically and chemically stable and completely liquid at the test temperature. In addition it is preferred that the heat transfer agent be non-flammable. Polyphenol ether, a synthetic lubricating oil, is one satisfactory heat transfer agent when liquid lubricants are being tested. In some applications a solid heat transfer agent may be used.

A container or sample can 52 is used to hold the liquid cants, the sample can or container is made of an aluminum deep drawing alloy. The sample can may be made of any conductive material providing it does not react chemically or physically with the liquid being tested. Once the particular material for forming the sample can has been selected, it must be held constant for all future testing of a given liquid. It is very important in the method of testing that all variables other than the liquid being tested be held constant in order to have accurate readings. Accordingly, although the size and geometrical configuration of the sample can may vary, they should remain constant for a given liquid. Also, the volume of liquid being tested in the can should always be constant. A level may be scribed on a portion of the can so that the can will always contain an appropriate amount of the test liquid. The can may be mounted within an aperture 54 in the top of the tank and a wiping gasket 56 may surround the can to remove excess heat transfer material as it is removed.

The sample can 52 is mounted to the probe structure indicated generally at 58 by tightening clamp screws 60, the points 62 of the clamp screws piercing the sample can. The screws 60 may be mounted in suitable clamps or the like 53 positioned on opposite sides of the probe structure.

The probe structure in general may include a probe stem 66 which extends down within the sample can or container 52 and mounts a probe tip 68 at its lower end. The probe shaft 66 may be formed of a suitable insulating material, for example Teflon or the like, and the electrical current for the probe is carried by an internal rod 70 indicated in dotted lines in FIGURE 3. It is important that the rod 70 be well insulated as the current values used are very low. The rod 70 is suitably connected, through a wire 72, to a connector 74, the connector in turn being attached to the cabinet 10. A probe body 76 mounts the probe stem 66 and seats upon a clamp 78 which receives the clamp screws 60. The clamp 78 is seated on a probe guide 79 which aligns the probe and sample can with the aperture 54.

When it is desired to test a liquid within the sample can 52, a D.C. voltage is applied between the probe and the can 52 so that electrical current will flow through the liquid. This voltage is applied, for example, by placing the negative terminal of the voltage on the probe and the positive terminal to the outside of the tank 14 by connection 80 illustrated at the bottom left-hand corner of FIGURE 3. The outside of the tank 14 is metal and is connected through bolts 28, and the cover 26, to the screws 62 which pierce the can 52. In this way, there is a complete electrical circuit from the negative side through the probe, liquid, and sample can to the positive side. The particular polarity of the voltage applied to the sample can is not at all important.

FIGURE 5 illustrates a simplified wiring diagram and includes a probe calibration resistor R2 which is connected directly to the tank 14 and is used to set the probe voltage prior to testing. A D.C. supply voltage 82 applies the potential between the probe and the sample can. A switch S6 may be used to select any one of resistors R4 through R9, which are the range calibration resistors. The switch S6 is indicated at 84 in FIGURE 1 and the potentiometer R2 is indicated at 88. The range calibration resistors R4 through R9 are used to set a meter 90 on any one of a number of different scales to read the conductivity of the liquid being tested and hence its degradation. In this respect, the meter 90 will be calibrated to read directly the degradation of a particular liquid.

In use, the voltage drop across any one of the resistors R4 through R9 appears as a signal to the grid of tube V1. This signal, amplified by tube V2, is then fed to the meter 90. The circuit, as shown in FIGURE 5, is completed by a resistor R1 which is a zero adjust resistor for use in initially setting the meter 90. The zero adjust control is indicated at 92 on control panel 10a.

There are various electrical components positioned within the cabinet 10 which have not been described, and which are not essential to an understanding of the invention. For example, as mentioned above, there is also a timer, as well as a number of relays which tie in the electrical components. Preferably the A.C. and D.C. components are isolated from each other within the cabinet.

The use, operation and function of the invention are as follows:

The present invention is useful in testing liquids and in particular indicating what change in quality a particular liquid has undergone. This change may be read by the unit described providing that the change is reflected by a corresponding change in electrical resistance or conductivity of the liquid. Liquid lubricants increase in electrical conductivity after they have been in service and the present invention is useful in testing such liquids.

In operation, once the test sample is immersed in the heat transfer agent, the heater is turned on and sufficient time is given for the heat transfer agent and the test sample to be brought up to a predetermined temperature. In the case of liquid lubricants, it is desirable to raise the temperature of the test sample above ambient temperature or room temperature, and for example to a temperature of 300° F. The timer within the cabinet 10 is factory set so that the heat transfer agent and sample will be brought up to this temperature prior to the testing operation. Once these materials are up to temperature a "ready" light will be lit.

After operating temperature has been attained, a predetermined set D.C. voltage is applied to the probe. This voltage will always be the same for a given sample or type of liquid as it is necessary that all conditions in the circuit other than the liquid sample being tested, be constant. The voltage applied to the probe will develop a current through the liquid being tested and this current can be read on the meter 90. The meter is calibrated directly in the amount of degradation for the particular liquid being tested.

Although the invention has been described as utilizing a grounded sample can and a probe connected to the high voltage side, in some applications it may be desirable to use two probes, one connected to ground and the other to the high voltage side.

The apparatus is useful in testing lubricants for airplane engines. At present, most airlines and the military services replace oil in aircraft engines and the like at predetermined given intervals, regardless of the quality of the oil. This is done primarily because it takes approximately eight hours to find out whether or not a given sample of oil is still satisfactory. It is simply not economically feasible to test the oil when it takes this long and it is therefore established procedure simply to change it at given intervals. The present invention provides a means of testing oil samples within a few minutes.

The present invention is not limited in application to the testing of oil in aircraft engines, but can be utilized wherever a lubricant is in use, for example, car and truck engines, machine tool lubricating systems, railroad locomotive engines and the like.

Whereas the preferred form of the invention has been shown and described herein, it should be realized that there are many modifications, substitutions and alterations thereto within the scope of the following claims.

I claim:

1. A device for measuring the degradation of liquids by measuring their electrical conductivity, including a tank having a heat transfer agent therein, a circumferentially extending heater element about said tank, insulation surrounding said heater element, an agitator in said tank and means for driving it to agitate the heat transfer agent, a thermostat extending into said heat transfer agent and effective to control the heater, a cover on said tank having a defined opening, a container having a predetermined geometric configuration for holding a controlled volume of the liquid to be tested, said container being mounted in said defined opening and extending into the heat transfer agent, a probe fixed to said container and extending therein into contact with the liquid to be tested, means for applying a controlled voltage between the probe and the container, and means for measuring the current flow through said liquid.

2. The structure of claim 1 further characterized in that said container is electrically connected to said tank.

3. The structure of claim 1 further characterized by and including means for insulating said probe from said container.

References Cited by the Examiner

Meredith et al.: "Conductivities in Emulsions," Journal of the Electrochemical Society, volume 108, No. 3 (March 1961), pages 286 to 290.

FREDERICK M. STRADER, *Primary Examiner.*